United States Patent
Yu et al.

(10) Patent No.: US 12,077,373 B2
(45) Date of Patent: Sep. 3, 2024

(54) GAS ABSORPTION BOX

(71) Applicants: GUANGDONG BRUNP RECYCLING TECHNOLOGY CO., LTD., Guangdong (CN); HUNAN BRUNP RECYCLING TECHNOLOGY CO., LTD., Hunan (CN); HUNAN BRUNP EV RECYCLING CO., LTD., Hunan (CN)

(72) Inventors: Haijun Yu, Guangdong (CN); Aixia Li, Guangdong (CN); Yinghao Xie, Guangdong (CN); Xuemei Zhang, Guangdong (CN); Kang Chen, Guangdong (CN); Changdong Li, Guangdong (CN)

(73) Assignees: GUANGDONG BRUNP RECYCLING TECHNOLOGY CO., LTD., Guangdong (CN); HUNAN BRUNP RECYCLING TECHNOLOGY CO , LTD., Hunan (CN); HUNAN BRUNP EV RECYCLING CO., LTD., Hunan (CN)

( * ) Notice: Subject to any disclaimer, the term of this patent is extended or adjusted under 35 U.S.C. 154(b) by 0 days.

(21) Appl. No.: 18/553,111

(22) PCT Filed: May 31, 2022

(86) PCT No.: PCT/CN2022/096307
§ 371 (c)(1),
(2) Date: Sep. 28, 2023

(87) PCT Pub. No.: WO2023/005405
PCT Pub. Date: Feb. 2, 2023

(65) Prior Publication Data
US 2024/0083673 A1     Mar. 14, 2024

(30) Foreign Application Priority Data

Jul. 29, 2021    (CN) ......................... 202110866005.2

(51) Int. Cl.
*B65D 90/30* (2006.01)
*B65D 49/02* (2006.01)
*B65D 81/32* (2006.01)
*B65D 90/00* (2006.01)

(52) U.S. Cl.
CPC ......... *B65D 90/30* (2013.01); *B65D 81/3272* (2013.01); *B65D 49/02* (2013.01); *B65D 90/0066* (2013.01)

(58) Field of Classification Search
CPC ..... H01M 4/1391; B65D 90/30; B65D 90/28; B65D 90/205
(Continued)

(56) References Cited

U.S. PATENT DOCUMENTS 6,536,425 B1 * 3/2003 Izuchukwu .............. A61G 1/01
128/202.16
2014/0186249 A1   7/2014   Ateya Soliman

FOREIGN PATENT DOCUMENTS

CN    204395892 U    6/2015
CN    208910262 U    5/2019
(Continued)

OTHER PUBLICATIONS

International Search Report for PCT/CN2022/096307 mailed Aug. 23, 2022, ISA/CN.

*Primary Examiner* — Anthony D Stashick
*Assistant Examiner* — Raven Collins
(74) *Attorney, Agent, or Firm* — Yue (Robert) Xu; Apex Attorneys at Law, LLP

(57) ABSTRACT

A gas absorption box includes a box body, at least one gas absorption member and an outer housing assembly, the box
(Continued)

body has an accommodating cavity; the gas absorption member is elastic and is provided with a first inner cavity, and the first inner cavity is in communication with the outside of the box body; and the outer housing assembly is arranged in the accommodating cavity and is elastically connected to the box body, and the outer housing assembly has a second inner cavity for accommodating a gas absorbent, the second inner cavity being in communication with the first inner cavity, and the gas absorption member being capable of absorbing gas for the second inner cavity. When battery powder or some positive-electrode materials for batteries are transported, hydrogen generated by the battery powder or some positive-electrode materials for batteries gathers towards the upper portion of a ton bag.

8 Claims, 4 Drawing Sheets

(58) Field of Classification Search
USPC .......................................................... 220/749
See application file for complete search history.

(56) References Cited

FOREIGN PATENT DOCUMENTS

| CN | 210440967 U | 5/2020 |
| CN | 112337217 A | 2/2021 |
| CN | 113694625 A | 11/2021 |

* cited by examiner

GAS ABSORPTION BOX

The present application is a National Phase entry of PCT Application No. PCT/CN2022/096307, filed on May 31, 2022, which claims priority to Chinese Patent Application No. 202110961094.9, titled "GAS ABSORPTION CASE", filed on Jul. 29, 2021 with the China National Intellectual Property Administration, which are incorporated herein by reference in their entireties.

FIELD

The present application relates to the technical field of battery recycling, in particular to a gas absorption case.

BACKGROUND

Generally, the powder for battery or some cathode materials for battery are transported in a flexible freight bag. In order to avoid the powder for battery from being exposed to rain during transportation, multiple layers of packaging film are provided for externally wrapping the flexible freight bag, so as to isolating the flexible freight bag from rainwater, which facilitates the lifting and transporting for large-scale products. The powder for battery or some cathode materials for battery are prone to generate hydrogen in transportation. When the generated hydrogen reaches a certain concentration, it may explode in the case of fire or static electricity.

SUMMARY

The present application is direct to solve at least one of the technical problems existing in the conventional art. For this end, the present application provides a gas absorption case, which can improve the safety of the battery transportation process.

The gas absorption case according to an embodiment of the present application includes a case body, at least one gas-suction member and an outer housing assembly. The case body is provided with an accommodation chamber, and the gas-suction member is elastic and provided with a first inner chamber. The first inner chamber is communicated with the outside of the case body. The outer housing assembly is provided in the accommodation chamber and is elastic connected with the case body. The outer housing assembly is provided with a second inner chamber for accommodating a gas absorbent, which is communicated with the first inner chamber. The gas-suction member is configured to suck the gas, to be eliminated, into the second inner chamber.

The gas absorption case according to embodiments of the present application has the following beneficial technical effects.

In the transportation of the powder for battery or some cathode materials for battery, the hydrogen generated by the powder for battery or some cathode materials for battery gather toward the upper part of the flexible freight bag, and a gas absorption case is provided on the upper part of the flexible freight bag, and the second inner chamber is provided with a gas absorbent capable of removing hydrogen, the outer housing assembly is movable relative to the case body, so that the gas-suction member can automatically absorb hydrogen with its own elastic vibration to remove the hydrogen in the second inner chamber, thereby decreasing the hydrogen concentration in the flexible freight bag in the transportation process and improving the safety of the transportation process.

According to some embodiments of the present application, the case body is provided with a first communicating valve, through which the first inner chamber is communicated with the outside of the case body, and the outer housing assembly is provided with a second communicating valve, through which the second inner chamber is communicated with the first inner chamber, so that the gas to be eliminated is directly sucked into the second inner chamber by the gas-suction member to be absorbed or removed.

According to some embodiments of the present application, both the first communicating valve and the second communicating valve are of a check valve to prevent the gas from being leaked to the outside of the case body, thereby improving the suction efficiency for gas.

According to some embodiments of the present application, a filter assembly is connected to one end, away from the gas-suction member, of the second communicating valve, the filter assembly can filter impurities or dust entrained in the sucked gas and improve the absorption efficiency of the gas absorption case.

According to some embodiments of the present application, the outer housing assembly includes at least two outer housings, the at least two outer housings are connected to form the second inner chamber, and two adjacent outer housings are detachably connected, which facilitates loading or replacing the gas absorbent in the second inner chamber, and improves the service life of the gas absorption case.

According to some embodiments of the present application, an inner housing assembly are further provided, which is accommodated in the second inner chamber. The inner housing assembly and the outer housing assembly are connected by a support, which facilitates the fixation of the inner housing assembly.

According to some embodiments of the present application, the inner housing assembly includes at least two inner housings. The at least two inner housings are connected to form a third inner chamber capable of accommodating the gas absorbent, which facilitates loading or replacing the gas absorbent in the third inner chamber, thereby improving the service life of the gas absorption case.

According to some embodiments of the present application, multiple through holes are provided in the housing surface of the inner housing assembly, and the third inner chamber is communicated with the second inner chamber through the through holes to allow gas entering into the third inner chamber 720 to be absorbed or removed.

According to some embodiments of the present application, a filter is provided on an outer side wall of the case body, and the outer side wall of the case body is provided with a mounting grooves corresponding to the filter. The filter is detachably mounted in the mounting groove to facilitate the mounting of the filter.

According to some embodiments of the present application, an exhaust port is provided on the outer housing, which can improve the suction efficiency of the gas absorption case.

The additional aspects and advantages of the present application will be given in the following description, and some of those will be apparent from the following description or be understood from the practice of the present application.

BRIEF DESCRIPTION OF THE DRAWINGS

The above and/or additional aspects and advantages of the present application will become apparent and easy to understand from the description of the embodiments in conjunction with the following drawings, in which.

Figure 1:
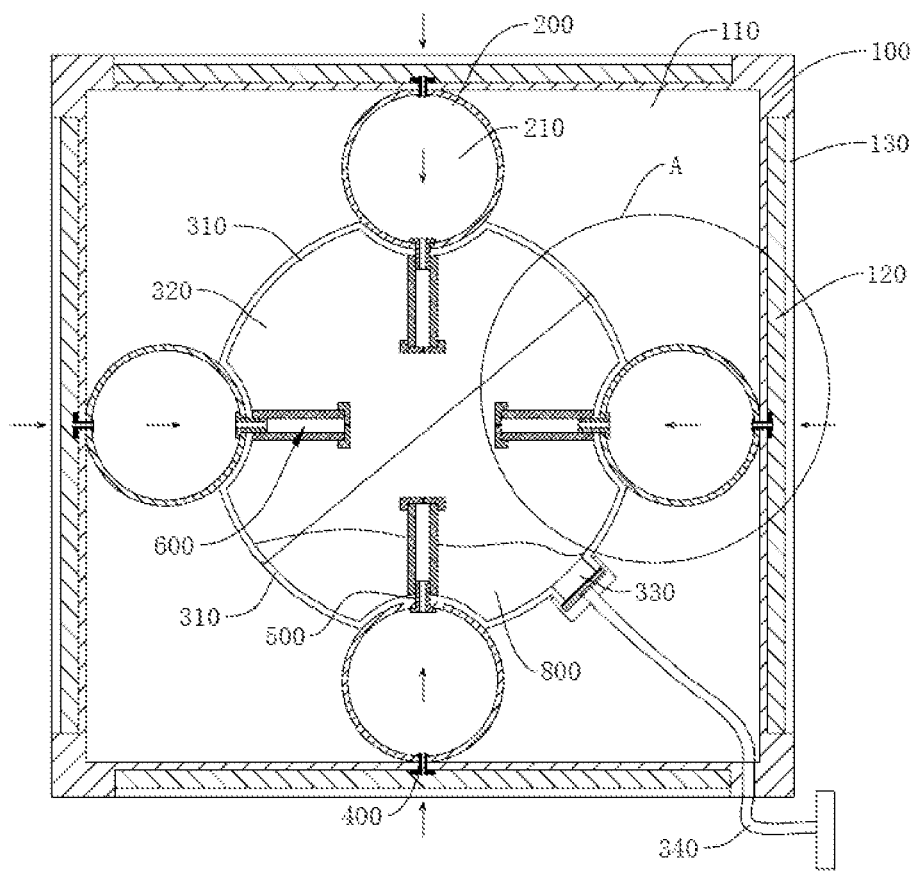
FIG. 1 is a schematic structural view of a gas protection case according to an embodiment of the present application.

NUMERAL REFERENCE case body 100, accommodation chamber 110, filter 120, mounting groove 130, gas-suction member 200, first inner chamber 210, outer housing 310, second inner chamber 320, exhaust port 330, exhaust pipe 340, first communicating valve 400, first passage 410, second communicating valve 500, second passage 510, filter assembly 600, extension pipe 610, filter cap 620, inner housing 710, third inner chamber 720, support 730, third passage 731, through hole 740, gas absorbent 800.

DETAILED DESCRIPTION OF THE EMBODIMENTS

The embodiments of the present application will be described in detail below. Examples of the embodiments are shown in the accompanying drawings, in which the same or similar elements or elements with the same or similar functions will be designated by the same or similar reference numerals throughout the specification. The embodiments described below with reference to the accompanying drawings are exemplary, and are only configured to explain the present application, but should not be understood as limiting the present application.

In the description of the present application, it should be understood that the orientation indicated by terms "up", "down", "front", "rear", "left", "right" and the like or positional relationships are based on the orientation or positional relationships shown in the drawings, and are merely for the convenience of describing the present application and the simplification of the description, and do not indicate or imply that the device or element referred to must be in a particular orientation, or be constructed and operated in a particular orientation, and therefore should not be construed as a limit to the scope of the present application.

In the description of the present application, "several" refers to one or more, "multiple" refers to two or more, "greater", "less", "exceeding", etc. are understood to not include the number itself, and "above", "below", and "within" are understood to include the number itself. If "first" and "second" are described, which are only configured to distinguish one entity from several other entities, it cannot be understood as indicating or implying relative importance or implicitly specifying the number of the indicated technical features or implicitly specifying the order of the indicated technical features relation.

In the description of the present application, unless otherwise specified and limited, terms such as "setting", "installation", and "connection" should be understood in a broad sense, and those skilled in the art can reasonably determine the specific meaning of the above terms in the present application in combination with the specific content of the technical solution.

As shown in FIG. 1 to 4, a gas absorption case provided according to an embodiment of the present application includes a case body 100, at least one gas-suction member 200 and an outer housing assembly. The case body 100 is provided with an accommodation chamber 110, and the gas-suction member 200 is elastic and provided with a first inner chamber 210. The first inner chamber 210 is communicated with the outside of the case body 100. The outer housing assembly is provided in the accommodation chamber 110 and is elastically connected with the case body 100. The outer housing assembly is provided with a second inner chamber 320 for accommodating a gas absorbent, the second inner chamber 320 is communicated with the first inner chamber 210. The gas-suction member 200 is configured to suck the gas to be eliminated into the second inner chamber 320, and the gas is in contact with gas absorbent 800 in the second inner chamber 320 and thus a part of the gas is absorbed or removed. The gas-suction member 200 can automatically suck the gas through elastic vibration without additional energy, and can work effectively for a long time so as to improve the safety of the battery transportation process.

Specifically, in the transportation of the powder for battery or some cathode materials for battery, the hydrogen generated by the powder for battery or some cathode materials for battery gather toward the upper part of the flexible freight bag. A gas absorption case is provided on an upper part of the flexible freight bag, the second inner chamber 320 is provided with a gas absorbent capable of removing hydrogen, the outer housing assembly is movable relative to the case body 100, and thus the gas-suction member 200 can automatically absorb hydrogen with its own elastic vibration to remove the hydrogen in the second inner chamber 320, thereby decreasing the hydrogen concentration in the flexible freight bag during the transportation process and improving the safety of the transportation process.

In addition, the outer housing assembly is elastically connected to the case body 100 by the gas-suction member 200. The gas-suction member 200 has a structure of sphere with elasticity and the number thereof being six. The case body 100 has a structure of cube. The gas-suction member 200 corresponds to and is communicated with each of side walls of the case body 100, respectively, so as to increase the suction volume of gas, thereby improving the safety of the transporting the powder for battery.

It should be noted that the gas-suction member 200 is made of a material with high elasticity and high resilience, such as thermoplastic rubber, silicone, etc., which will not be described in detail herein.

It should be noted that the outer housing assembly may also be elastically connected to the case body 100 by the cooperation of at least one gas-suction member 200 and at least one spring, which will not be described in detail herein.

It should be noted that the gas absorbent 800 may be palladium sponge, activated carbon, alumina, etc., and the gas to be absorbed may also be carbon monoxide, methane, or water vapor, which will not be described in detail herein.

It should be noted that the case body 100 may also be a spherical structure, a polyhedral structure, etc., which will not be described in detail herein.

Figure 2:
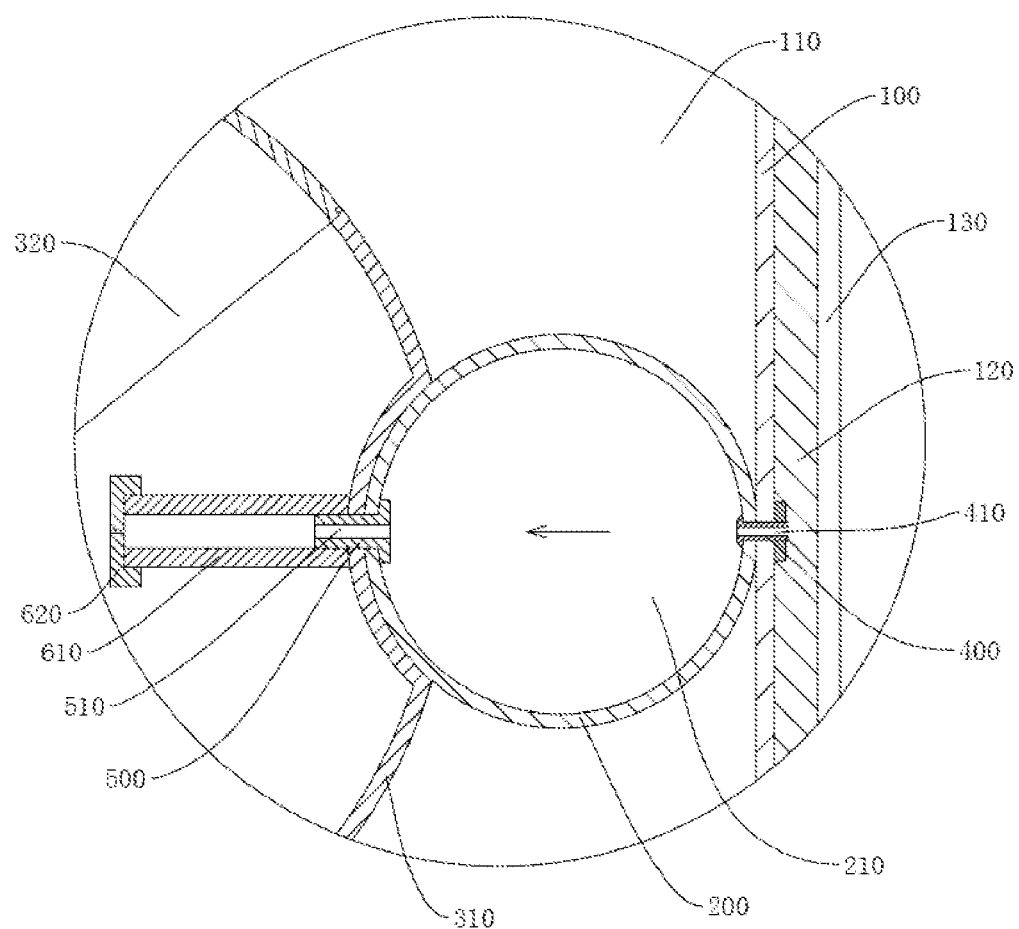
FIG. 2 is a partial enlarged view of part A shown in FIG. 1.
Figure 4:
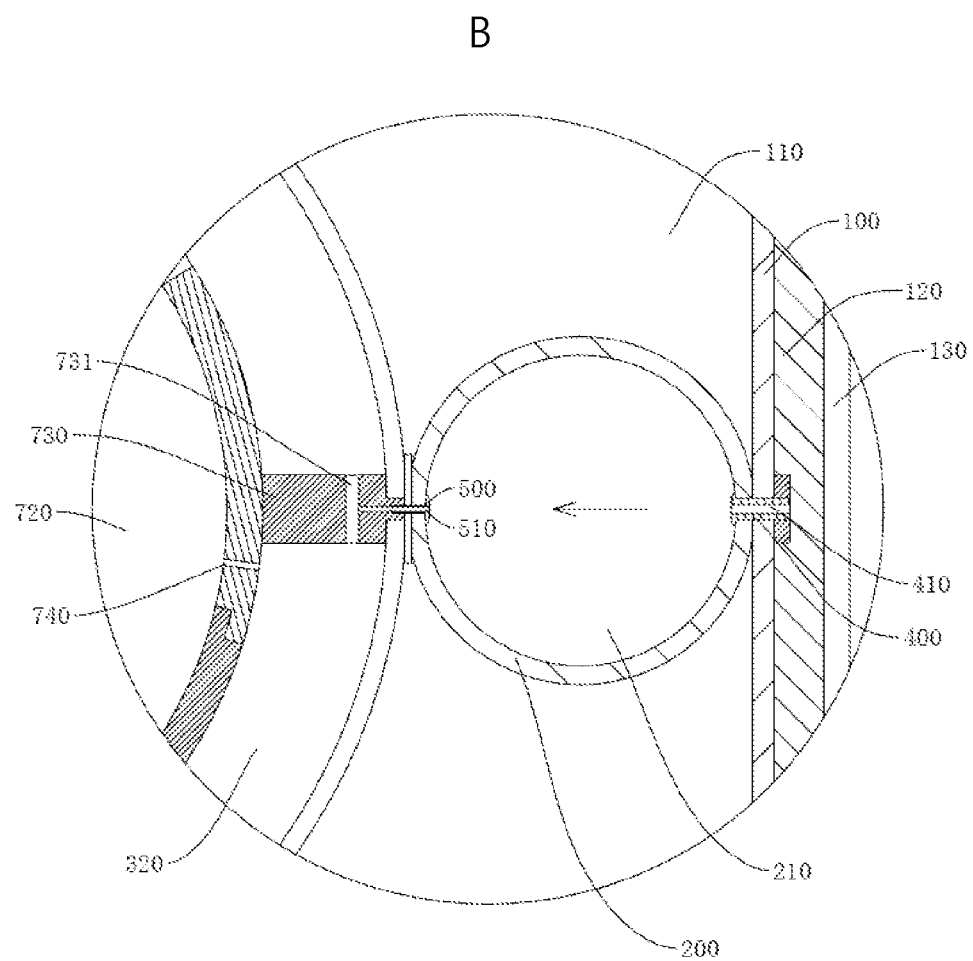
FIG. 4 is a partial enlarged view of part B shown in FIG. 3.

As shown in FIGS. 2 and 4, in some examples of the present application, the case body 100 is provided with a first communicating valve 400, through which the first inner chamber 210 is communicated with the outside of the case body 100, and the outer housing assembly is provided with a second communicating valve 500, through which the second inner chamber 320 is communicated with the first inner chamber 210, so that the gas to be eliminated is directly sucked into the second inner chamber 320 by the gas-suction member 200 to be absorbed or removed.

Specifically, the first communicating valve 400 is provided with a first passage 410, and the second communicating valve 500 is provided with a second passage 510. One end of the first passage 410 is communicated with the outside of the case body 100, and the other end of the first passage 410 is communicated with the first inner chamber 210. One end of the second passage 510 is communicated with the first inner chamber 210, and the other end of the second passage 510 is communicated with the second inner chamber 320, so that the gas to be eliminated can be directly sucked into the second inner chamber 320 by the gas-suction member 200 to be absorbed or removed.

As shown in FIGS. 2 and 4, in some examples of the present application, both the first communicating valve 400 and the second communicating valve 500 are of a check valve, which is non-return to the outside of the case body, thereby preventing the gas from being leaked to the outside of the case body 100, thereby improving the suction efficiency for gas.

As shown in FIG. 2, in some examples of the present application, a filter assembly 600 is connected to the end, away from the gas-suction member 200, of the second communicating valve 500, the filter assembly 600 can filter impurities or dust entrained in the sucked gas and reduce the loss of gas absorbents 800 at the valve port of the second communicating valve 500, which facilitates the collection of the gas absorbent 800.

Specifically, the filter assembly 600 includes an extension pipe 610 and a filter cap 620. One end of the extension pipe 610 is threadedly connected with the check valve, and the other end of the extension pipe 610 is threadedly connected with the filter cap 620. The filter cap 620 is provided with at least one filtering aperture, and the filter cap 620 can filter the impurities or dust entrained in the sucked gas. The extension pipe 610 can allow the gas absorbent 800 to be in contact with the filter cap 620, thereby reducing the loss of the gas absorbent 800 at the valve port of the second communicating valve 500 and facilitating the collection of the gas absorbent 800.

Figure 3:
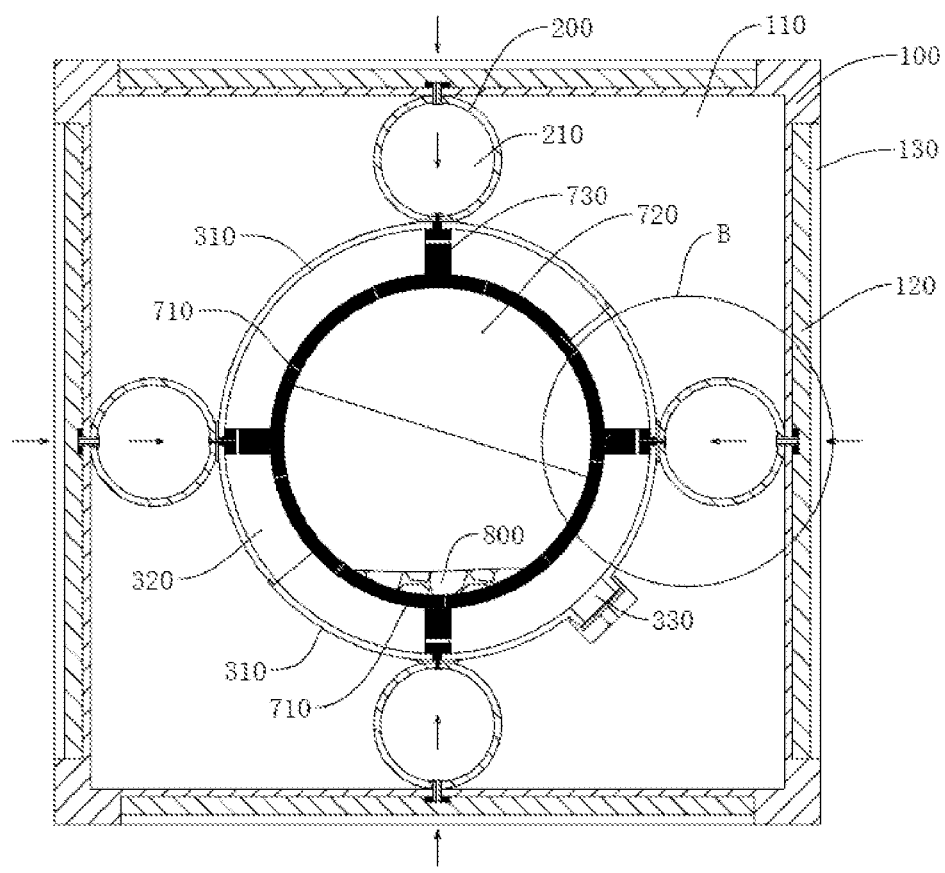
FIG. 3 is a schematic view of the structure of a gas protection case according to another embodiment of the present application.

As shown in FIGS. 1 and 3, in some embodiments of the present application, the outer housing assembly includes at least two outer housings 310, which are connected to form the second inner chamber 320. Two adjacent outer housings 310 are detachably connected, which facilitates loading or replacing the gas absorbent 800 in the second inner chamber 320, and improves the service life of the gas absorption case.

Specifically, when the gas absorbent 800 is loaded or replaced, the gas absorbent 800 can be replaced by removing only one of the outer housings 310, so that the gas absorption case is able to continue running, and the service life of the gas absorption case can be improved.

It should be noted that the two adjacent outer housings 310 can be secured to each other by bolt connection or snap-fit connection to achieve a detachable connection, which will not be described in detail herein.

It should be noted that the outer housing component may be in the shape of a sphere, an ellipsoid, or a polyhedron, etc., which will not be described in detail herein.

As shown in FIG. 3, in some examples of the present application, an inner housing assembly is further provided, which is accommodated in the second inner chamber 320. The inner housing assembly and the outer housing assembly are connected by a support 730, which facilitates the fixation of the inner housing assembly.

Specifically, the inner housing assembly is arranged in the second inner chamber 320, one end of the support 730 is fixedly connected to the inner housing assembly, and the other end of the support 730 is fixedly connected to the outer housing assembly, which facilitates the fixation of the inner housing.

In addition, the support 730 and the second communicating valve 500 are threadedly connected, and the support 730 is provided with a third passage 731 being communicated with the second passage 510, so as to facilitate the mounting of the support 730.

It should be noted that the inner housing assembly may be in the shape of a sphere, an ellipsoid, or a polyhedron, and the support 730 may has a structure of support column or a support ball, etc., which will not be described in detail herein.

As shown in FIG. 3, in some examples of the present application, the inner housing assembly includes at least two inner housings 710. The at least two inner housings 710 are connected to form a third inner chamber 720 capable of accommodating the gas absorbent 800, which facilitates loading or replacing the gas absorbent 800 in the third inner chamber 720, thereby improving the service life of the gas absorption case.

Specifically, when the gas absorbent 800 is loaded or replaced, the gas absorbent 800 can be replaced by removing only a part of the inner housings 710, so that the gas absorption case is able to continue running, and the service life of the gas absorption case can be improved.

It should be noted that the two adjacent inner housings 710 can be secured to each other by bolt connection or snap-fit connection to achieve a detachable connection, which will not be described in detail herein.

As shown in FIG. 4, in some examples of the present application, multiple through holes 740 are provided on the surface of the inner housing assembly, and the third inner chamber 720 is communicated with the second inner chamber 320 through the through holes 740 so as to facilitate the gas entering into the third inner chamber 720 to be absorbed or removed.

Specifically, the gas is absorbed by the gas absorbent 800 in the third inner chamber 720, so that the air pressure in the third inner chamber 720 is lower than that in the second inner chamber 320. By providing multiple through holes 740, it facilitates the gas in the second inner chamber 320 entering into the third inner chamber 720 to be absorbed or removed.

As shown in FIGS. 1 to 4, in some examples of the present application, a filter 120 is provided in an outer side wall of the case body 100, and a mounting groove 130, corresponding to the filter 120, is defined in the outer side wall of the case body 100. The filter 120 is detachably mounted in the mounting groove 130 to facilitate the mounting of the filter 120.

Specifically, the filter 120 has a structure of the filter screen. The filter 120 is accommodated in the mounting groove 130, and can cover the valve port of the first communicating valve 400, which facilitates filtering impurities or dust entrained the sucked gas, thereby improving absorption efficiency of the gas absorption case.

As shown in FIGS. 1 and 3, in some examples of the present application, an exhaust port 330 is provided on the outer housing, which can improve the suction efficiency of the gas absorption case.

Specifically, in the process that the gas-suction member 200 is constantly inflating gas to the second inner chamber 320, a part of gas is absorbed by the gas absorbent 800, and the unabsorbed gas is always accommodated in the second inner chamber 320, so that the gas pressure in the second inner chamber 320 is continuously increasing. By providing the exhaust port 330, it facilitates the second unabsorbed gas being discharged from the second inner chamber 320, which can improve the gas suction efficiency of the gas absorption case.

In addition, the exhaust port 330 is connected with an exhaust pipe 340, the case body 100 is provided with a through hole, and the exhaust pipe 340 passes through the through hole. The second filter cap 620 is connected to one end, away from the exhaust port 330, of the exhaust pipe 340, which facilitates the discharge of the unabsorbed gas.

In addition, a vent hole may be provided on the side wall of the case body 100 for discharging the unabsorbed gas, which will not be described in detail herein.

The technical features of the above-mentioned embodiments can be in any combination. For the sake of simplicity to the description, all possible combinations of the various technical features in the above-mentioned embodiments are not described. However, as long as there is no contradiction in the combination of these technical features, all should be considered as falling in the scope of this specification.

The embodiments of the present application are described in detail with reference to the accompanying drawings, but the present application is not limited to the above-mentioned embodiments. Within the cognitive scope of those skilled in the art, various changes are possible without departing from the spirit of the present invention.

The invention claimed is:

1. A gas absorption case, comprising:
a case body provided with an accommodation chamber;
at least one gas-suction member which is elastic and provided with a first inner chamber, wherein the first inner chamber is communicated with an outside of the case body;
an outer housing assembly which is provided in the accommodation chamber and is elastically connected with the case body, wherein the outer housing assembly is provided with a second inner chamber for accommodating a gas absorbent, and the second inner chamber is communicated with the first inner chamber,
wherein the gas-suction member is configured to suck the gas, to be eliminated, into the second inner chamber,
wherein the case body is provided with a first communicating valve, through which the first inner chamber is communicated with the outside of the case body, and the outer housing assembly is provided with a second communicating valve, through which the second inner chamber is communicated with the first inner chamber,
wherein both the first communicating valve and the second communicating valve are of a check valve.

2. The gas absorption case according to claim 1, characterized in that, a filter assembly is connected to one end, away from the gas-suction member, of the second communicating valve.

3. The gas absorption case according to claim 1, characterized in that, the outer housing assembly comprise at least two outer housings, the at least two outer housings are connected to form a second inner chamber, and two adjacent outer housings are detachably connected.

4. The gas absorption case according to claim 1, characterized in that, further comprising an inner housing assembly accommodated in the second inner chamber, wherein the inner housing assembly and the outer housing assembly are connected by a support.

5. The gas absorption case according to claim 4, characterized in that, the inner housing assembly comprises at least two inner housings, which are connected to form a third inner chamber for accommodating the gas absorbent, and the two adjacent inner housings are detachably connected.

6. The gas absorption case according to claim 5, characterized in that, a plurality of through holes is provided in the inner housing assembly, and the third inner chamber is communicated with the second inner chamber through the plurality of through holes.

7. The gas absorption case according to claim 1, characterized in that, a filter is provided in an outer side wall of the case body, and the outer side wall of the case body is provided with a mounting groove corresponding to the filter, and the filter is detachably mounted in the mounting groove.

8. The gas absorption case according to claim 1, characterized in that, an exhaust port is provided on the outer housing.

* * * * *